United States Patent
Fernandez et al.

(10) Patent No.: US 6,678,103 B2
(45) Date of Patent: Jan. 13, 2004

(54) METHODS AND APPARATUS FOR INCREASED MAGNETIC CODING DENSITY BY PRECISE PLACEMENT OF MAGNETIC TRANSITIONS

(75) Inventors: Alberto J. Fernandez, Miami, FL (US); Carlos D. Bormey, Miami, FL (US); Ismael E. Negrin, Miami, FL (US)

(73) Assignee: XTec, Incorporated, Miami, FL (US)

( * ) Notice: Subject to any disclaimer, the term of this patent is extended or adjusted under 35 U.S.C. 154(b) by 0 days.

(21) Appl. No.: 10/281,656

(22) Filed: Oct. 25, 2002

(65) Prior Publication Data

US 2003/0043488 A1 Mar. 6, 2003

Related U.S. Application Data

(63) Continuation of application No. 09/562,989, filed on May 1, 2000, now Pat. No. 6,476,991.

(51) Int. Cl.[7] .................... G11B 5/09; G11B 20/10; G06K 19/06
(52) U.S. Cl. .............. 360/39; 360/40; 360/2; 235/493; 235/449; 713/176
(58) Field of Search ............... 360/39, 40, 44, 360/2, 48, 55; 235/493, 449, 380; 713/176; 341/71–72; G11B 5/09; G06K 19/06

(56) References Cited

U.S. PATENT DOCUMENTS

| | | | | |
|---|---|---|---|---|
| 4,114,029 A | * | 9/1978 | Lee | 235/449 |
| 5,254,843 A | * | 10/1993 | Hynes et al. | 235/449 |
| 5,546,462 A | * | 8/1996 | Indeck et al. | 713/176 |
| 5,625,689 A | * | 4/1997 | Indeck et al. | 235/380 |
| 5,770,846 A | * | 6/1998 | Mos et al. | 235/440 |
| 6,031,671 A | * | 2/2000 | Ayres | 360/40 |

* cited by examiner

*Primary Examiner*—David Hudspeth
*Assistant Examiner*—Dan I. Davidson
(74) *Attorney, Agent, or Firm*—Priest & Goldstein, PLLC (57) ABSTRACT

Methods and apparatus for increasing the density of data storage on a magnetic medium by using variations in positioning of magnetic transitions to encode bits. Conventionally encoded bits are written to the medium as sequences of magnetic transitions according to an encoding standard. Additional bits are encoded on the medium as deviations from a nominal position of magnetic transitions separating conventionally encoded bits. The deviation from the nominal position is within an allowable range of tolerance for the standard followed in encoding the conventionally encoded bits. In order to prevent accumulation of error, additional bits are only encoded in transitions separating a pair of conventionally encoded bits. The first and last transitions of the pair do not have additional bits encoded as deviations of transition locations. This technique allows the encoding of one additional bit for every two conventionally encoded bits.

16 Claims, 8 Drawing Sheets

METHODS AND APPARATUS FOR INCREASED MAGNETIC CODING DENSITY BY PRECISE PLACEMENT OF MAGNETIC TRANSITIONS

The present application claims the benefit of allowed U.S. application Ser. No. 09/562,989 now U.S. Pat. No. 6,476,991, entitled "Methods and Apparatus for Increased Magnetic Coding Density by Precise Placement of Magnetic Transitions" filed May 1, 2000 and incorporated by reference herein in its entirety.

CROSS-REFERENCE TO RELATED APPLICATION

Fernandez U.S. Pat. No. 5,616,904 issued Apr. 1, 1997 and assigned to the assignee of the present invention addresses related subject matter and is incorporated by reference herein in its entirety.

FIELD OF THE INVENTION

The present invention relates generally to improvements in magnetic data encoding. More particularly, the invention relates to improvements in data encoding density achieved through precise placement and reading of magnetic transitions on a magnetic medium.

BACKGROUND OF THE INVENTION

Magnetic media such as tape has long been popular for storage of data. Magnetic media is used in many applications, of which some examples are computer hard disks, magnetic tape cartridges suitable for backup of computer hard disks, and magnetic stripes for storage of data on identification cards. As technology advances and information needs become greater and greater, users of all storage media, including magnetic media, find advantages in storing information more and more densely. Magnetic media store information through the establishment of magnetic transitions on a medium. Increasing density through increasing the number of transitions on a medium often leads to increases in cost, which can be substantial if a very large number of transitions are to be placed in a small space. Moreover, because of inherent limitations in technology, as well as limitations inherent in the nature of the medium, there is typically a limit to the information density which can be achieved using a magnetic medium, especially if it is desired to use readily available components. Furthermore, standards which prevail in many applications such as magnetic identification cards specify the density of the information which can be placed on the media through magnetic transitions. For example, standards governing the encoding of information on magnetic stripes of credit cards often specify the information to be placed on the card and the method by which the information is to be written. In order to achieve compatibility between the different cards and card reading devices, the cards must conform to the standards. Many standards allow no room for other information beyond the information specified in the standards, if increasing the information content of the cards is to depend on increasing the number of magnetic transitions on a card.

Similar limitations exist in other magnetic media such as magnetic tapes, in cases in which it would be desirable to increase the density of information stored on the medium, but because of standards to be followed or limitations of the medium it is impossible to increase the number of magnetic transitions on the medium. This is particularly true in cases involving financial identification cards such as credit or debit cards. Magnetic stripe credit or debit cards typically have only a small area available for magnetic storage of information. The content of this information is specified by standards promulgated by institutions such as MASTERCARD® and VISA®. The standards typically do not leave room for any additional information.

It would often prove useful to add additional security information to credit or debit cards, but because of the standards for design of the cards, no room is available for adding additional information in the form of additional magnetic transitions.

In addition, situations arise in which it may be necessary to store information on a magnetic medium in a way which is transparent to devices operating according to a particular standard, but which can be read by devices operating according to a different standard. For example, it may be desirable to encode authentication information on an identification card such as a credit card in a way which is transparent to preexisting readers, but which can be read by readers designed to detect the authentication information.

Encoding standards for magnetic data storage typically define a nominal placement of magnetic transitions used to represent data, and allow for deviations within a certain tolerance from this nominal placement. Magnetic transitions are typically recognized by sensing of peak points in a signal produced by the passage of the magnetic media alongside a read head. In a typical magnetic encoding process, the peak points, and therefore the recognized magnetic transitions, deviate from the nominal. The deviation from the precise placement of the peak points is referred to as "jitter." The Fernandez patent, cited above, describes techniques for reading patterns of jitter in order to define a magnetic signature for a magnetic medium, used for authentication of that magnetic medium.

If deviation from the nominal position of a magnetic transition, or jitter, can be controlled, this represents additional information which can be used to encode data. The Fernandez patent cited above describes the use of already present jitter as a source of additional information for authentication of a medium, but does not describe the use of controlled jitter as a means for encoding information on a medium.

There exists, therefore, a need in the art for a technique for increasing density of information stored on a magnetic medium which does not require an increase in the number of magnetic transitions on the medium and which uses precisely controlled positioning of placement of magnetic transitions on the medium to define additional information that is transparent to devices not equipped to read the additional information.

SUMMARY OF THE INVENTION

An information storage system according to the present invention includes a media writer adapted to make precise placements of magnetic transitions on a magnetic medium. The writer writes conventional bits along a magnetic medium by placing magnetic transitions along the length of the medium according to a predefined standard. For example, in order to write a binary "1", the writer may place a transition from low to high, followed after a narrow interval by a transition from high to low, with a narrow interval following before a transition. To write a binary "0", the writer may place a transition from low to high, followed after a wide interval by a transition from high to low, with no interval following before the next bit is able to begin. Placement of each transition is defined by a standard which defines a nominal placement and an allowable deviation from the nominal.

In order to encode additional bits, the writer places transitions between bits in positions deviating from the nominal. To encode an additional "0", the writer places the transition ahead of the nominal position. To encode an additional "1", the writer places the transition behind the nominal position. The deviations from the nominal are within tolerances defined by the standard for encoding bits, which may be a standard used by prior art readers. For example, one prior art standard for writing data on a magnetic identification card allows a deviation of 8% from the nominal. In order to encode an additional "0", the writer may place a transition such that the distance between the transition beginning the bit and the transition ending the bit is at least 3% greater than the nominal distance between the transitions. In order to encode an additional "1", the writer may place a transition such that the distance between the transition beginning the bit and the transition ending the bit is at least 3% less than the nominal distance between the transitions. Requiring that the deviation be at least 3% from the nominal distinguishes deviations which represent additional data from randomly occurring deviations. Conventional writers are typically capable of placing transitions within 3% of the nominal position, so that if a transition is seen to deviate 3% or more from the nominal position, it may be safely interpreted as representing data.

In order to prevent accumulation of errors, additional bits are represented by adjusting placement of transitions between conventionally encoded bits. Adjusting placement of a transition separating members of a pair of bits need not change the placement of the transitions at the beginning and end of the pair of bits. Therefore, the transitions at the beginning and the end of the pair of bits can remain in their nominal positions.

A reader according to the present invention reads transitions in order to decode bits, interpreting sequences of transitions as "1s" or "0s" according to predetermined standards for encoding and decoding data. The reader also detects placement of transitions which deviate from nominal placement in order to detect additional data. The reader detects deviations of transitions between bits. If the distance between transitions is at least 3% greater than the nominal distance, for example, the deviation from the nominal may be interpreted as representing an additional "0", while if the distance between transitions is at least 3% less than the nominal distance, the deviation from the nominal may be interpreted as representing an additional "1".

A prior art reader which reads a card or other magnetic medium encoded according to the techniques of the present invention can read bits which were conventionally encoded without detecting the additional bits encoded by placement of transitions. This allows, for example, the addition of security or other authentication information which can be detected by appropriate readers but which does not interfere with readers not suitably equipped to detect the information.

If a magnetic medium encoded with a writer according to the present invention is read by a prior art reader, the bits represented by transitions will be read. Bits encoded by placement of transitions will not be detected and will not interfere with the reading of the conventionally encoded information.

A more complete understanding of the present invention, as well as further features and advantages of the invention, will be apparent from the following Detailed Description and the accompanying drawings.

DETAILED DESCRIPTION

Figure 1A:
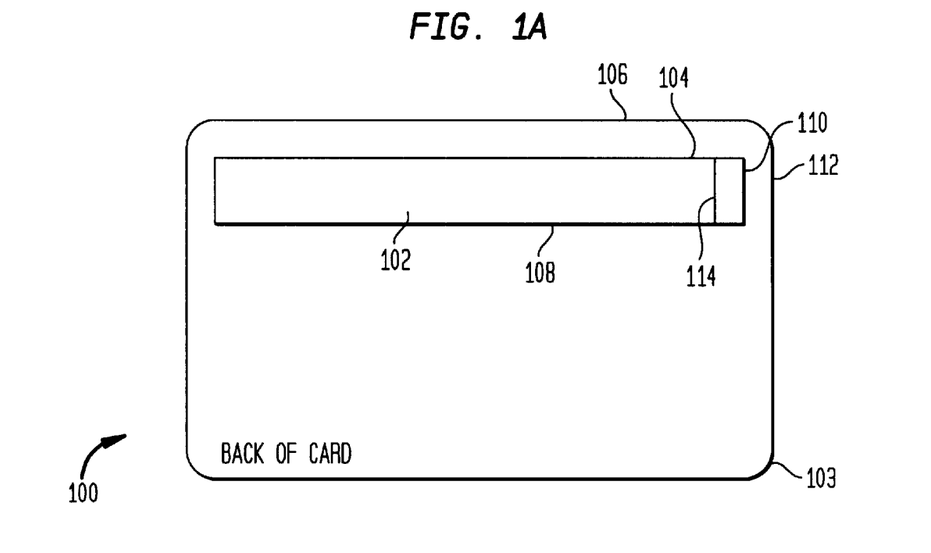
FIG. 1A illustrates a portion of a magnetic card suitable for reading and writing according to the present invention.

FIG. 1A illustrates a rear view of a commonly used magnetic card 100 designed according to the standard ISO ID-1, a widely followed standard for the design of magnetic cards, showing a magnetic stripe area 102 which may advantageously be written and read by a system according to the present invention. The card 100 is 53.98 mm high by 85.60 mm wide by 0.76 mm thick, and has corners such as the corner 103 with a radius of 3.18 mm. The magnetic stripe area 102 is 82.55 mm wide by 10.28 mm high. The magnetic stripe area 102 has a top edge 104 which is 5.54 mm from the top 106 of the card 100 and a bottom edge 108 which is 15.82 mm from the top 106 of the card 100. A right edge 110 of the magnetic stripe area 102 lies 2.92 mm from a right edge 112 of the card 100. Data is encoded on the card magnetic stripe are 102 with a first bit 114 beginning 7.44 mm from the right edge 112 of the card 100. The magnetic stripe area 102 includes first, second and third tracks 116, 118 and 120 respectively.

Figure 1B:
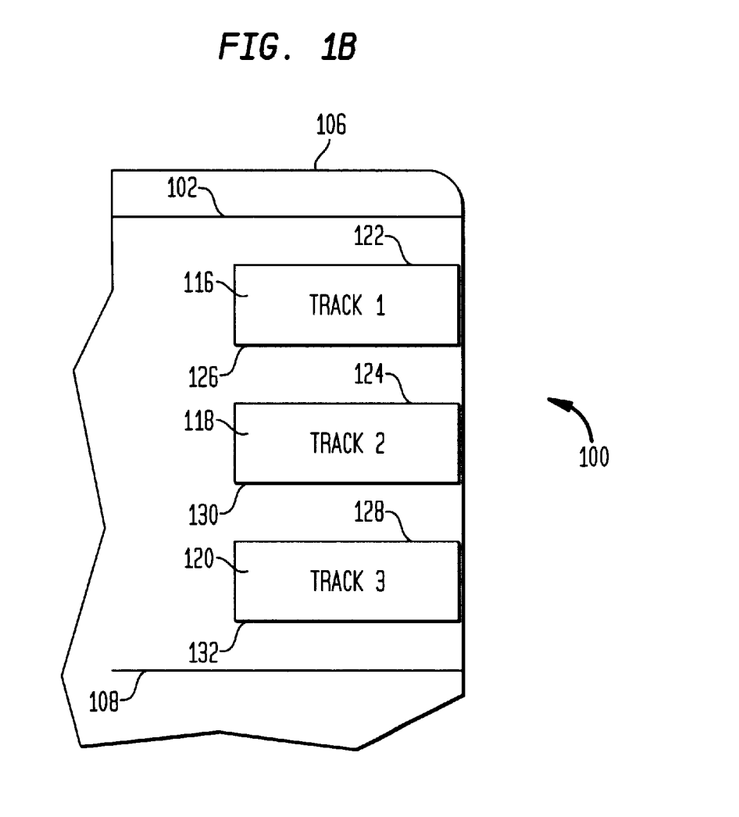
FIG. 1B illustrates in greater detail a magnetic stripe area of the magnetic card of FIG. 1A.

FIG. 1B is a more detailed view of the magnetic stripe area 102 of the card 100, illustrating first, second and third magnetic tracks 116, 118 and 120, respectively. The first magnetic track 116 is 5.66 mm from the top 106 of the card, and has a top edge 122 which is 0.12 mm from the top edge 104 of the magnetic stripe 102. The first magnetic track 116 is 2.80 mm in width.

The second track 118 has a top edge 124 which is 0.50 mm from a bottom edge 126 of the first track 116. The second track 118 is 2.80 mm in width.

The third track 120 has a top edge 128 which is 0.76 mm from a bottom edge 130 of the second track 116. The third track 120 is 2.80 mm in width. The third track 120 also has a bottom edge 132 which is 0.56 mm from the bottom edge 108 of the magnetic stripe area 102.

While a magnetic card 100 is illustrated herein as an example, it will be recognized that the teachings of the present invention may be extended to other magnetic media, such as tapes, disks or any other desired form of magnetic media adapted to represent data using magnetic transitions.

Figure 2A:
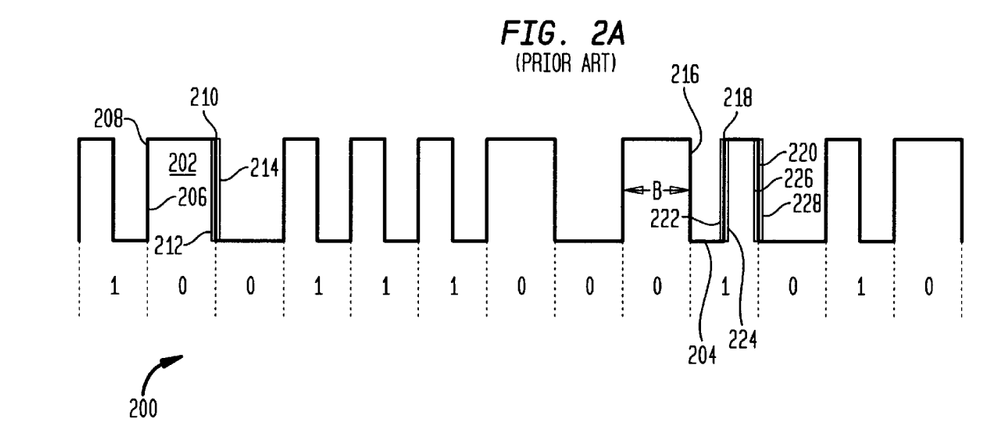
FIG. 2A illustrates a string of data encoded according to a prior art encoding standard.

FIG. 2A illustrates a sample string of data 200 written according to a prior art recording system. The string of data 200 is not shown to scale. The string of data 200 is similar to data which may be written to tracks 1 and 3 of a magnetic card such as the card 100. Illustrated here as examples are a first bit 202, which is encoded as a "0", and a second bit 204, which is encoded as a "1". It can be seen that the first bit 202 includes a transition 208 at a left edge and a transition 210 at a right edge. The transition 210 may be in a nominal position 0.12 mm from the transition 208, or may be within a tolerance of 8% from the nominal position. The transition 210 may thus be between 0.11 mm and 0.13 mm from the transition 208, that is between the limits 212 and 214. The bit 204 includes a transition 216 at a left edge, and an upper transition 218 followed by a lower transition 220. The upper transition 218 may be in a nominal position 0.06 mm from the transition 216 or may deviate by 10% from the nominal position. Thus, the upper transition may be within a range of 0.054 mm to 0.066 mm from the transition 216, that is between the limits 222 and 224. The lower transition 220 may be at a nominal position 0.05 mm from the upper transition 218, or may deviate by 10% from the nominal position. That is, the lower transition 220 may be within a range of 0.045 mm to 0.055 mm from the upper transition 218, that is between the limits 226 and 228 Because the position of the upper transition 218 relative to the transition 216 may also fall within a range, the lower transition 220 may fall within a range of 0.099 mm to 0.121 mm from the transition 216.

Figure 2B:
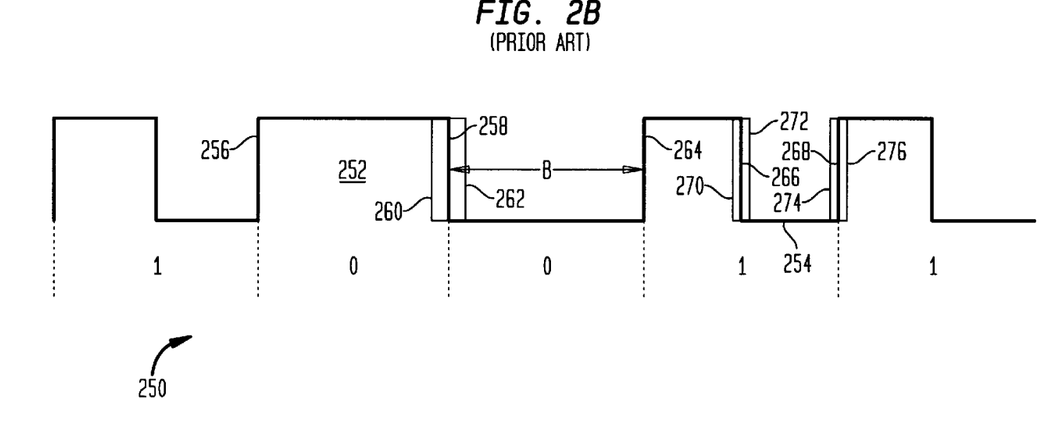
FIG. 2B illustrates a string of data encoded according to a prior art encoding standard.

FIG. 2B illustrates a sample string of data 250 written according to a prior art recording system. The string of data 250 is not drawn to scale. The string of data 250 is similar to data which may be written to track 2 of a magnetic card such as the card 100. Dimensions are shown for a first bit 252, which is encoded as a "0", and a second bit 254, which is encoded as a "1". It can be seen that the first bit 252 includes a transition 256 at a left edge and a transition 258 at a right edge. The transition 258 may be in a nominal position 0.34 mm from the transition 256, or may be within a tolerance of 5% from the nominal position. The transition 258 may thus be between 0.32 mm and 0.36 mm from the transition 256, that is between the limits 260 and 262.

The bit 254 includes a transition 264 at a left edge, and a lower transition 266 followed by an upper transition 268. The lower transition 266 may be in a nominal position 0.170 mm from the transition 264 or may deviate by 7% from the nominal position. Thus, the lower transition 266 may be within a range of 0.158 mm to 0.182 mm from the transition 264, that is between the limits 270 and 272. The upper transition 268 may be at a nominal position 0.05 mm from the lower transition 266, or may deviate by 10% from the nominal position. That is, the upper transition 268 may be within a range of 0.045 mm to 0.055 mm from the lower transition 266, that is between the limits 274 and 276. Because the position of the lower transition 266 relative to the transition 264 may also fall within a range, the upper transition 268 may fall within a range of 0.203 mm to 0.237 mm from the transition 264.

Figure 3:
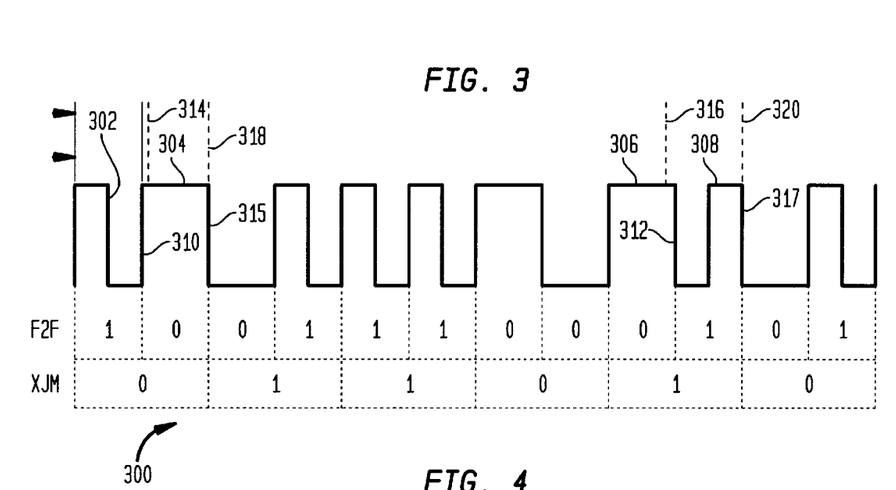
FIG. 3 illustrates a string of data encoded according to the teachings of the present invention.

FIG. 3 illustrates a string of data 300 written according to the teachings of the present invention. The string of data 300 is not drawn to scale. The string of data 300 may suitably be written to a track such as track 1 or 3 of the card 100 of FIG. 1. The string of data 300 includes a series of bits encoded by magnetic transition sequences, of which bits 302, a "1", 304, a "0", 306, a "0", and 308, a "1", are given as examples. A transition 310 separates the bits 302 and 304 and a transition 312 separates the bits 306 and 308. The transitions 310 and 312 are not placed in a nominal position according to the standard data encoding system by which they are written. Instead, the transition 310 is placed such that the distance between the transition 310 which begins the bit 304 and the transition 315 which terminates the bit 304 is at least 3% greater than the nominal distance which would be achieved if the bit 304 began at the nominal position 314. The transition 312 is placed such that distance between the transition 312 which begins the bit 308 and the transition 317 which terminates the bit 308 is at least 3% less than the nominal distance which would be achieved if the bit 308 began at the nominal position 316. In this way, an additional "0" is encoded between the bits 302 and 304 and an additional "1" is encoded between the bits 306 and 308. The placement of the transitions 310 and 312 is within the tolerance margin for placement of transitions and therefore does not interfere with accurate reading of the bits 302 and 304. However, a suitably designed reader is capable of reading the placement of the transitions 310 and 312 to interpret the bits represented by the placement of the transitions 310 and 312.

In this way, one additional bit may be encoded through placement of transitions between bits for every two bits encoded through sequences of transitions. Because each additional bit is encoded by placement of the transition between members of a pair of bits, the problem of accumulation of error is avoided. For example, the transitions 315 and 317, each occurring at the end of a second bit of a pair, are in the nominal positions 318 and 320, respectively. If each bit which was conventionally encoded also had an additional bit encoded by placement of a transition, the additional bits could lead to accumulated deviations from the nominal position which accumulated to a substantial deviation. As an example, a string of 5 consecutive "1s" would lead to a deviation of 15% from the nominal position by the time the fifth "1" was written. However, placement of the transition which deviates from nominal at the boundary between two conventionally encoded bits insures encoding additional bits will not cause the length of a pair of bits to deviate from the nominal length. Each pair of bits will deviate from the nominal length only to the extent caused by ordinary deviations and errors inherent in the writing process.

Figure 4:
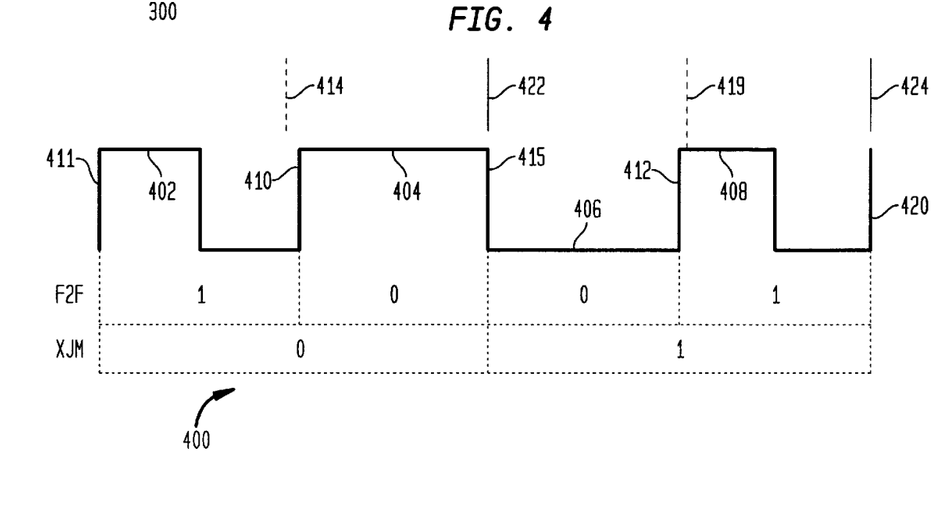
FIG. 4 illustrates a string of data encoded according to the teachings of the present invention.

FIG. 4 illustrates a string of data 400, written according to the teachings of the present invention. The string of data 400 is not drawn to scale. The string of data 400 may suitably be written to a track such as track 2 of the card 100 of FIG. 1. The string of data 400 includes a series of bits 402, 404, 406 and 408 encoded by magnetic transition sequences, of which bit 402 is a "1", bit 404 is a "0", bit 406 is a "0" and bit 408 is a "1". A transition 410 separates the bits 402 and 404 and a transition 412 separates the bits 406 and 408. The transitions 410 and 412 are not placed in a nominal position according to the standard data encoding system by which they are written. Instead, the transition 410 is placed such that the distance between the transition 411 which begins the bit 402 and the transition 410 which ends the bit 402 is at least 3% greater than would be achieved if the transition 410 were placed in a nominal position 414. The transition 412 is placed such that the distance between the transition 415 which begins the bit 406 and the transition 412 which ends the bit 406 is at least 3% less than would be achieved if the transition 412 were placed in a nominal position 419. The placement of the transition 410 encodes an additional "0" and the placement of the transition 412 encodes an additional "1". The placement of the transitions 410 and 412 is within the tolerance margin for placement of transitions and therefore does not interfere with accurate reading of the bits 402 and 404. However, a suitably designed reader is capable of reading the placement of the transitions 410 and 412 to interpret the bits represented by the placement of the transitions 410 and 412. Accumulation of error is avoided by placement of transitions which deviate from the nominal between pairs of bits. Thus, it can be seen that the transitions 415 and 420, each occurring at the end of a pair of bits, are in the nominal positions 422 and 424, respectively.

Figure 5:
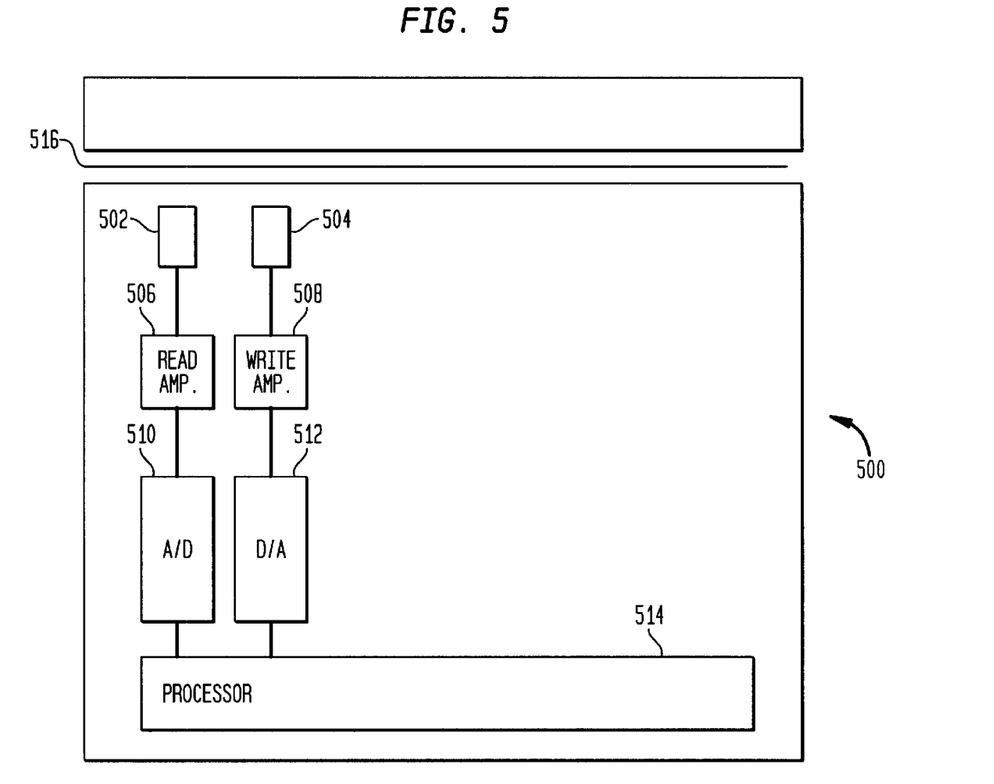
FIG. 5 illustrates a magnetic reading and writing device according to the teachings of the present invention.

FIG. 5 illustrates a magnetic reading and writing device 500 according to the present invention. The system 500 includes a read head 502, write head 504, read amplifier 506, write amplifier 508, analog to digital (A/D) converter 510, digital to analog (D/A) converter 512 and processor 514. When it is desired to write a magnetic track, the data to be written is supplied to the processor 510, which passes the data to the D/A converter 512 for conversion to analog format. The D/A converter 512 supplies the analog data to the write amplifier 508, which amplifies it and sends it to the write head 504 as a magnetic track 516 is passed adjacent to the read head 502 and write head 504. The read head detects sequencing data present on the track 516 as the track 516 is passed adjacent to the write head 502. The sequencing data is supplied to the processor 514, which uses the sequencing data to control the write operation, including timing and placement of write operations.

The write head 504 places magnetic transitions on the magnetic track 516 according to a standard for encoding bits. The write head 504 places conventional bits and additional bits on the track 516. Conventional bits are placed on the track 516 through writing of sequences of magnetic transitions. Additional bits are represented on the track 516 by the choice of position of transitions between conventional bits. The placement of transitions between conventional bits in a position deviating from a nominal position according to an encoding standard is used to represent data. Transitions deviate from the nominal within tolerances defined by the standard, but sufficient to be identified by a suitable reading and writing system such as the system 500. For example, an additional "0" may be represented by placing a transition such that the distance between transitions making up the conventional bit deviates by +3% from the nominal, while an additional "1" may be represented by placing a transition such that the distance between transitions making up the conventional bit deviates by –3% from the nominal.

If a magnetic medium written by a system such as the system 500 is read by a prior art, system, the bits which are encoded as sequences of transitions will be read normally because they are within the tolerances of the standard for encoding the medium. However, the additional bits which were encoded by placement of transitions will not be detected.

If a system such as the system 500 is used to read a medium previously encoded with conventional and additional bits, the read head 502 will detect magnetic transitions and generate a signal which will be sent to the read amplifier 506. The read head 502 will produce a precise signal from which position and timing of magnetic transitions can be identified. The read amplifier 506 will pass the signal to the A/D converter 510, which will convert the signal to digital form and pass it to the processor 514. The processor 514 will detect the bits which have been conventionally encoded as sequences of transitions. In addition, the processor 514 will detect the position and timing data in the signal and identify deviations from nominal positions of transitions which have been used to encode additional bits.

It will be recognized that a device similar to the device 500 may be designed, having the capability to read a conventionally encoded magnetic track or a track such as the track 516, but without the capability of writing. Such a device would include components such as the read head 502, read amplifier 506, A/D converter 510 and processor 514. The operation of the device would be similar to the reading operations described above for the device 500.

Figure 6:
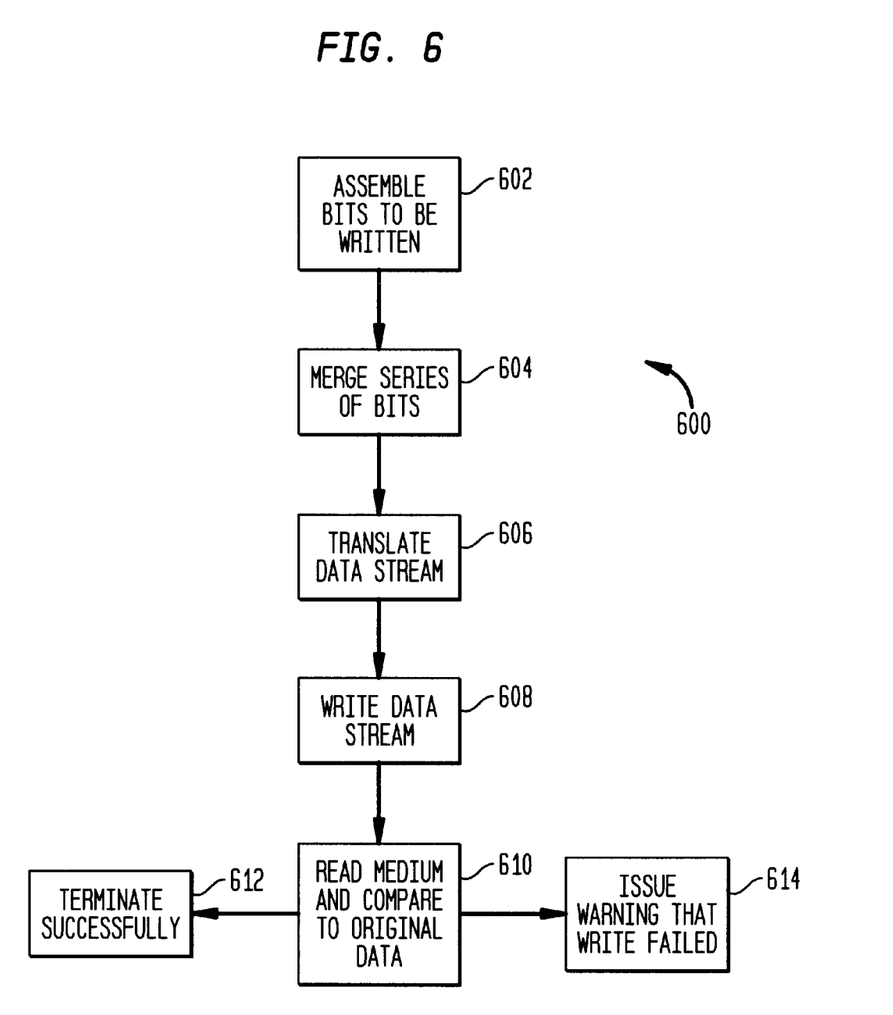
FIG. 6 illustrates a process for writing magnetic data according to the present invention.

FIG. 6 illustrates a process of writing data 600 according to the present invention. At step 602, a series of conventional and a series of additional bits are assembled to be written. At step 604, the series of conventional bits and the series of additional bits are merged into a data stream. At step 606, the data stream is translated into a series of magnetic transitions. Each conventional bit is represented by a series of magnetic transitions according to an encoding standard, and each additional bit is represented by a transition having a position deviating from a nominal position according to the encoding standard. Each additional bit is represented by a transition between two conventional bits. The transition representing the additional bit deviates from the nominal position by a defined amount, the defined amount falling within the tolerance allowed by the encoding standard. At step 608, each bit is written onto a magnetic medium. Each conventional bit is written by writing a series of magnetic transitions onto the medium, and each additional bit is written by placing a transition between a pair of conventional bits in a position deviating from the nominal. At 610, the magnetic medium is read and the data which is read from the medium compared to the data which was expected to be written to the medium. If the data which was read matches the expected data, the process proceeds to step 612 and the write process terminates successfully. If the data which was read does not match the expected data, the process proceeds to step 614 and a warning is issued that the write process failed.

Figure 7:
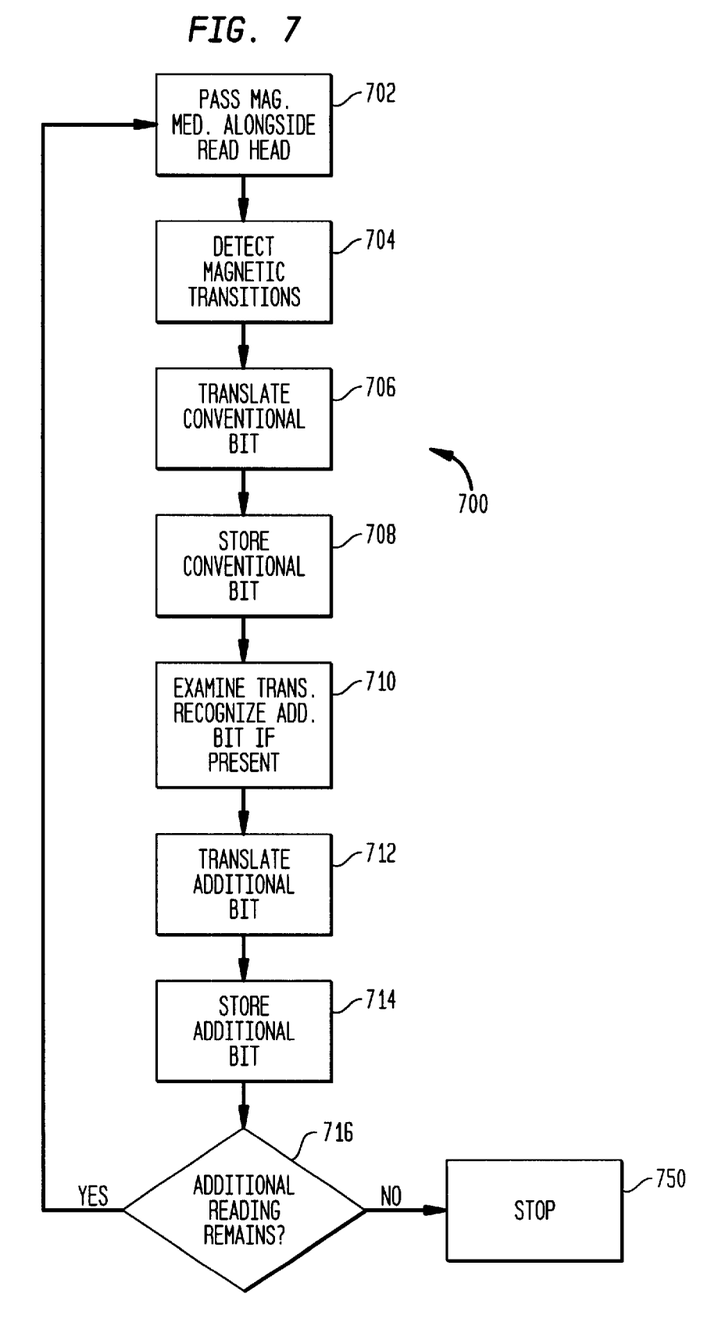
FIG. 7 illustrates a process for reading magnetic data according to the present invention.

FIG. 7 illustrates a process 700 of reading data according to the present invention. At step 702, a magnetic medium is passed alongside a read head. At step 704, magnetic transitions stored on the medium are detected. At step 706, a sequence of magnetic transitions representing an encoded conventional bit is translated according to an encoding standard into the bit represented by the sequence of transitions. At step 708, the bit is stored. At step 710, a transition separating two encoded bits is examined to determine if its placement deviates from nominal placement according to the encoding standard used to encode the bits. If the placement deviates from the nominal by a predefined amount, the transition is recognized as an additional encoded bit and stored. If the placement does not deviate from nominal by the predefined amount, no additional bit is recognized. At step 712, a sequence of magnetic transitions representing an encoded additional bit is translated according to an encoding standard into the bit represented by the sequence of transitions. At step 714, the additional bit is stored. At step 716, the parameters of the reading process are examined to determine if additional reading remains to be performed. This may be done, for example, by examining the last several bits read to determine if they represent a termination sequence, by examining predetermined parameters governing the amount of data to be read, examining time parameters, or by using any other technique desired. If no additional reading remains to be performed, the process terminates at step 750. If additional reading remains, the process returns to step 702.

Figure 8:
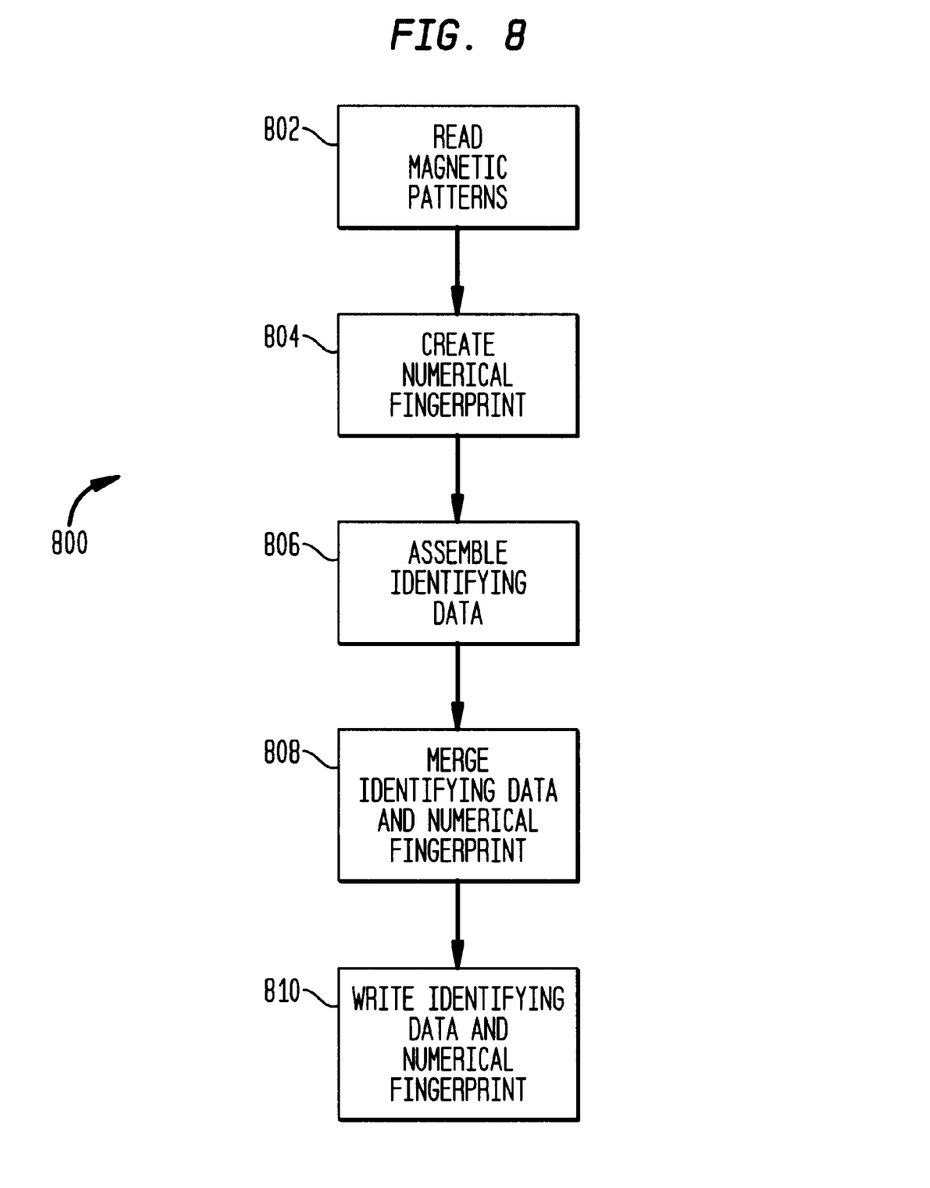
FIG. 8 illustrates a process for writing a magnetic card according to the present invention.

FIG. 8 illustrates a method 800 of storing magnetic card authentication information employing the techniques of the present invention. At step 802, magnetic patterns are read from the card in order to identify a magnetic fingerprint. Reading of the magnetic patterns and identification of the magnetic fingerprint may suitably be accomplished in accordance with the teachings of the Fernandez patent cited above. At step 804, a numerical representation of the magnetic fingerprint is created to form a numerical fingerprint. At step 806, identifying data to be written on the card is assembled. At step 808, the identifying data and the numerical fingerprint are merged to form a data stream. At step 810, the identifying data and the numerical fingerprint are written to the card. The identifying data is encoded as conventional bits represented by magnetic transitions, and the numerical fingerprint is encoded as additional bits represented by placement of magnetic transitions separating conventional bits. In this way, the numerical fingerprint can be written to the card while still leaving space for all other information required to be stored on the card. Storage of the numerical fingerprint does not interfere with the writing of other information.

Figure 9:
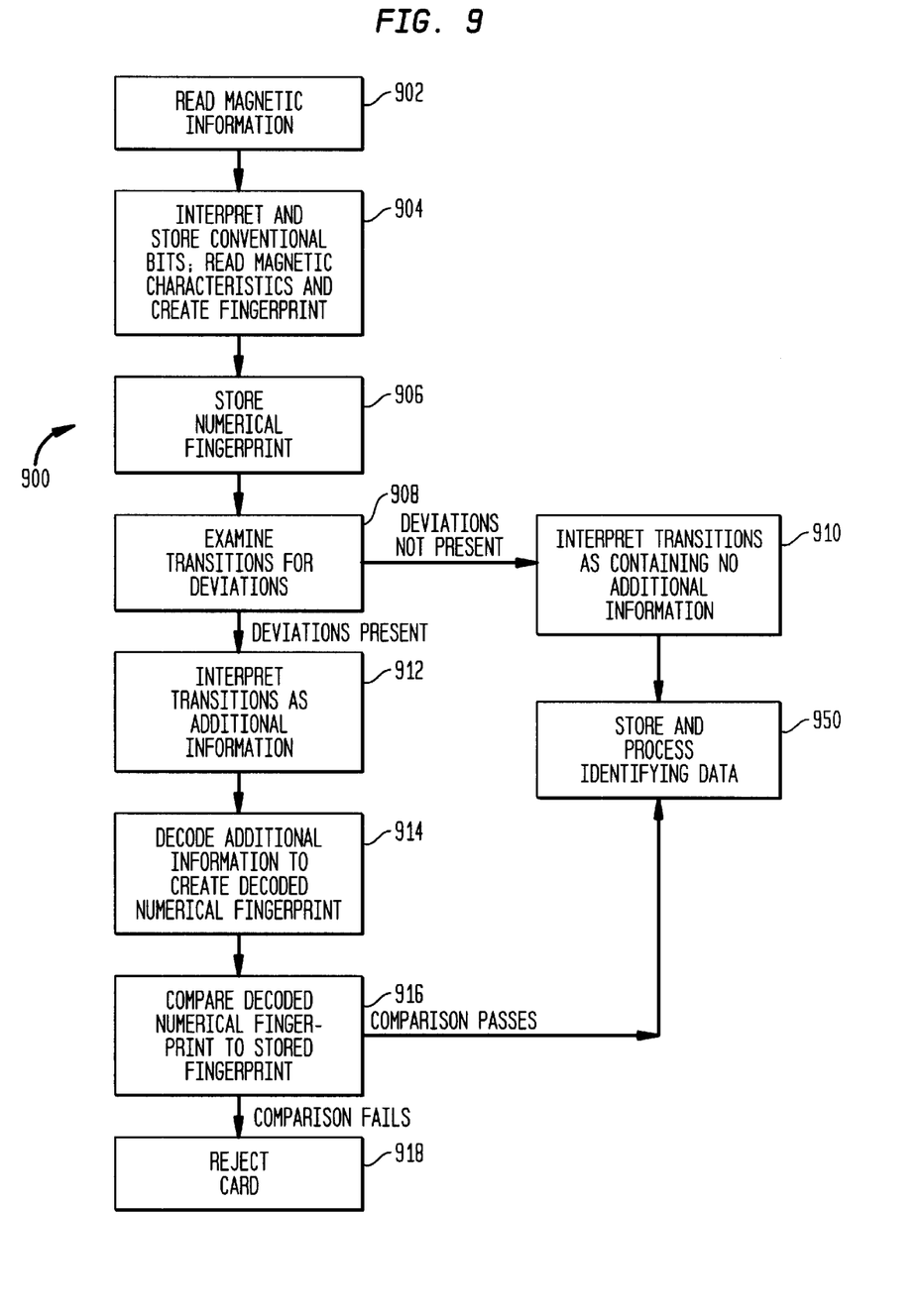
FIG. 9 illustrates a process for reading and authenticating a magnetic card according to the present invention.

FIG. 9 illustrates a method 900 of card authentication according to the present invention. At step 902, magnetic information is read from the card. At step 904, identifying information encoded as conventional bits is interpreted and stored. At the same time, magnetic characteristics of the card are read and converted to a numerical representation to create a numerical fingerprint. At step 906, the numerical fingerprint is stored. At step 908, the transitions separating conventional bits are examined for deviations to determine if they represent additional encoded information. If the transitions do not deviate more than a predetermined amount from a nominal position, the process proceeds to step 908 and the transitions are interpreted as containing no encoded information. The process then proceeds to step 950. If the transitions are displaced more than a predetermined amount from a nominal positions, the process proceeds to step 912 and the transitions are interpreted as containing encoded additional information. At step 914, the encoded additional information is decoded to create a decoded numerical fingerprint. At step 916, the decoded numerical fingerprint is compared to the stored numerical fingerprint. If the decoded numerical fingerprint fails to match the stored numerical fingerprint within predefined tolerances, the process proceeds to step 918 and the card is rejected. If the decoded numerical fingerprint matches the stored numerical fingerprint, the process proceeds to step 950. At step 950, the identifying information is retrieved and processed.

While the present invention is disclosed in the context of a presently preferred embodiment, it will be recognized that a wide variety of implementations may be employed by persons of ordinary skill in the art consistent with the above discussion and the claims which follow below.

We claim:

1. A method of data encoding providing increased data density comprising the steps of:

determining conventional bits for encoding on a magnetic medium;

determining additional bits for encoding on the magnetic medium; and encoding both the conventional bits and the additional bits on the magnetic medium, the conventional bits represented by a series of magnetic transitions spaced within tolerances of nominal positions of a predetermined standard, the additional bits represented by deviations of the spacing of the magnetic transitions from the nominal positions, wherein no additional bit is placed at a starting or ending transition of a pair of conventional bits.

2. The method of claim 1 wherein each additional bit is placed at a transition separating two conventional bits.

3. The method of claim 1 wherein each additional bit is placed at a transition between the pair of conventional bits.

4. The method of claim 1 wherein the deviations representing the additional bits differ from the nominal positions by at least about three percent.

5. The method of claim 1 wherein the magnetic medium is disposed on a magnetic card.

6. The method of claim 5 wherein the conventional bits comprise magnetic card identification information and the additional bits comprise a numerical representation of a magnetic fingerprint of the magnetic medium of the magnetic card.

7. The method of claim 6 further comprising the step of:

reading magnetic information from the card to identify the magnetic fingerprint.

8. A method of reading data from a magnetic medium comprising the steps of:

reading a series of magnetic transitions from the magnetic medium;

determining conventional bits encoded in the series of magnetic transitions, the conventional bits represented by the series of magnetic transitions spaced within tolerances of nominal positions of a predetermined standard; and determining additional bits encoded in the series of magnetic transitions, the additional bits represented by deviations of the spacing of the magnetic transitions from the nominal positions, wherein no additional bit is placed at a starting or ending transition of a pair of conventional bits.

9. The method of claim 8 wherein each additional bit is placed at a transition separating two conventional bits.

10. The method of claim 8 wherein each additional bit is placed at a transition between the pair of conventional bits.

11. The method of claim 8 wherein the deviations representing the additional bits differ from the nominal positions by at least about three percent.

12. The method of claim 8 wherein the magnetic medium is disposed on a magnetic card.

13. The method of claim 12 wherein the conventional bits comprise magnetic card identification information and the additional bits comprise a numerical representation of a stored magnetic fingerprint.

14. The method of claim 13 further comprising the step of:

reading magnetic information from the card to determine a read magnetic fingerprint of the card; and comparing the stored magnetic fingerprint with the read magnetic fingerprint to authenticate the magnetic card.

15. An apparatus for encoding data providing increased data density:

means for determining conventional bits for encoding on a magnetic medium;

means for determining additional bits for encoding on the magnetic medium; and means for encoding both the conventional bits and the additional bits on the magnetic medium, the conventional bits represented by a series of magnetic transitions spaced within tolerances of nominal positions of a predetermined standard, the additional bits represented by deviations of the magnetic transitions from the nominal positions, wherein no additional bit is placed at a starting or ending transition of a pair of conventional bits.

16. An apparatus for reading data from a magnetic medium comprising:
   means for reading a series of magnetic transitions from the magnetic medium;
   means for determining conventional bits encoded in the series of magnetic transitions, the conventional bits represented by the series of magnetic transitions spaced within tolerances of nominal positions of a predetermined standard; and
   means for determining additional bits encoded in the series of magnetic transitions, the additional bits represented by deviations of the magnetic transitions from the nominal distances positions,
   wherein no additional bit is placed at a starting or ending transition of a pair of conventional bits.

* * * * *